United States Patent [19]
Carter

[11] 3,848,758
[45] Nov. 19, 1974

[54] HYDRAULIC TRUCK BED
[76] Inventor: Jack N. Carter, Rt. 4, Nampa, Idaho 83651
[22] Filed: Aug. 30, 1973
[21] Appl. No.: 389,937

[52] U.S. Cl.................................. 214/501, 296/26
[51] Int. Cl............................................. B60p 1/16
[58] Field of Search............. 214/501, 505, 6 B, 82; 296/26

[56] References Cited
UNITED STATES PATENTS
| | | | |
|---|---|---|---|
| 2,701,654 | 2/1955 | Williamsen | 214/75 T |
| 2,848,127 | 8/1958 | Grey | 214/6 B |
| 2,996,203 | 8/1961 | Rosaia | 214/82 |
| 3,186,567 | 6/1965 | Blair | 214/505 X |

FOREIGN PATENTS OR APPLICATIONS
247,804   4/1969   U.S.S.R............................. 214/501

*Primary Examiner*—Albert J. Makay
*Attorney, Agent, or Firm*—John W. Kraft; Charles L. Kraft, II

[57] ABSTRACT
The hydraulic truck bed comprises a platform, loading forks fastened upstandingly from the rearwardmost terminal end of the platform and a movable headboard which may be selectively actuated against a container.

1 Claim, 5 Drawing Figures

HYDRAULIC TRUCK BED

FIELD OF THE INVENTION

The present invention relates to article handling, and more particularly to self-loading and unloading vehicles having a pivotal load body.

DESCRIPTION OF THE PRIOR ART

Apparatus for self-loading and unloading of containers from a vehicle having a pivotal load body generally include either means for sliding the container along an inclined plane provided by the load body, or means for loading and unloading the containers from upstanding adjacently disposed rows. The former may be used when storage space and access is not at a premium, while the latter tends to provide a more compact storage area in which the containers may be moved within the storage area in relatively narrow accessways. This is particularly the case when the container is intended to be used as a bin for carrying granular materials. Means for securing containers on a pivotal load body include lashings and suitably actuated, pivotally mounted retaining clamps. Lashings include cable tie-downs and lock latches. Lashings have the primary limitation that the teamster must demount from the cab to disengage the lashing means. It may be seen that with vehicles having pivotal load bodies which load or unload the container from a substantially upstanding position, lashings may be inaccessible during the acquisition or release phase of the respective loading and unloading operations. Compression clamps include various types of headboards and tail gates which are intended to pivot against the container. Typically, the hinge means for pivoting these compressive clamps are disposed on the platform at the lowermost side of the container, resulting in a minimized load on the base and lower portions of the container.

Accordingly, it is an object of this invention to provide a self-loading and unloading vehicle having a pivoted load body for containers, and includes mechanically actuated means for retaining a container on the load body.

It is also a primary object of this invention that the aforesaid means for retaining a container on the load body contact a relatively large area of the sidewalls of the container and that direct contact points between the actuating means and the container engage the more durable points of the container.

These and other objects shall become apparent from the description following, it being understood that modifications may be made without affecting the teachings of the invention here set out.

SUMMARY OF THE INVENTION

The hydraulic truck bed comprises a platform, loading forks fastened upstandingly from the rearwardmost terminal end of the platform and a movable headboard which may be selectively actuated against a container. The headboard is selectively actuated by means such as hydraulic rams which are disposed along the main beams which support the platform. The headboard may be provided with a container retaining lip which engages the uppermost terminal edge of the container to reduce loads on the base and lower portions of the container as it is being pivoted onto the platform.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
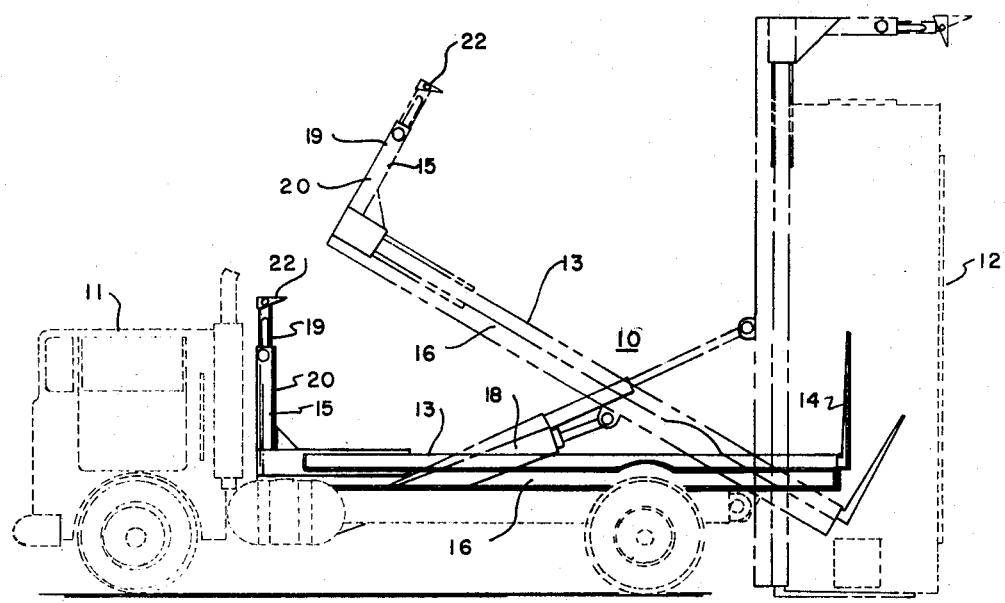
FIG. 1 is a side elevational view of the hydraulic truck bed of this invention including a container and the truck bed in several positions shown in the broken lines for illustrative purposes.

Referring now to the drawings and more particularly to the FIG. 1, the hydraulic truck bed of this invention is shown to advantage and generally identified by the numeral 10. The truck bed 10 is intended to be carried on a conventional, heavy-duty truck 11 and is intended to carry a variety of containers 12. As will be described below, hydraulic pressure for the various cylinders and the like is provided by the power plant of the truck 11. The truck bed 10 comprises a platform 13, loading forks 14 and a headboard 15. The platform 13 includes a pair of parallelly, rectilinearly disposed, suitably stiffened main beams 16, shown to advantage in the FIG. 3. The platform 13 may be provided with a decking 17 which provides increased stiffening, and operator work space, or may provide multiple uses for the truck having a truck bed 10. The platform 13 also may be provided with a plurality of rollers (not shown) to facilitate horizontal loading of the containers 12. The main beams 16 are pivotally mounted distally from their rearwardmost terminal ends to the rearwardmost terminal end of the chassis of the truck 11 by suitable hinging means 16'. The platform 13 is raised by an hydraulic ram 18 which is mounted in the forward portion of the truck 11 and in a point centrally in the main beams 16. The hydraulic ram 18 may be a double-acting telescoping ram to assist lowering as well as raising the platform 13.

The loading forks 14 are upstanding plate members mounted perpendicularly to the rearwardmost terminal end of the platform 13. The loading forks 14 are fabricated and finished to permit low-resistance passage of the container 12 with respect to the forks 14. The loading forks 14 may be detachably or fixedly fastened to the pallet 15, by suitable adjusting means.

Figure 2:
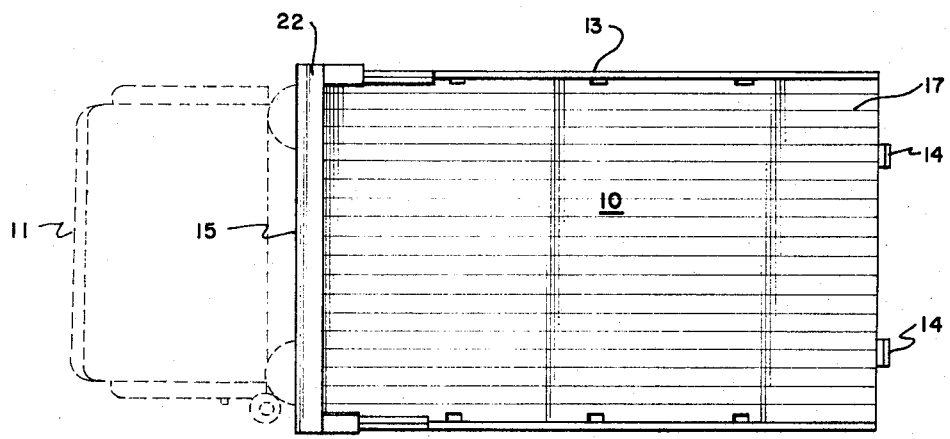
FIG. 2 is a top plan view of the apparatus of the FIG. 1.

As shown in the FIGS. 1 and 2, the headboard 15 is movably carried on the platform 13, and is adjustably fastened as to its type. The headboard 15 comprises a pair of upstanding corner-posts 19, a head plate 20 fastened upstandingly between the cornerposts 19, a headboard actuator sub-assembly 21, and an adjustable container retaining lip 22. The cornerposts 19 and head plate 20 are mounted on rollers 23 mounted within C-channel members 24 which ride on tracks 24' and 24", of the upper and lower sides of the platform 13 at their respective rectilinear edges. The C-channels 24 are disposed with their openings inwardly and are mounted along the outer sides of the platform 13.

Figure 3:
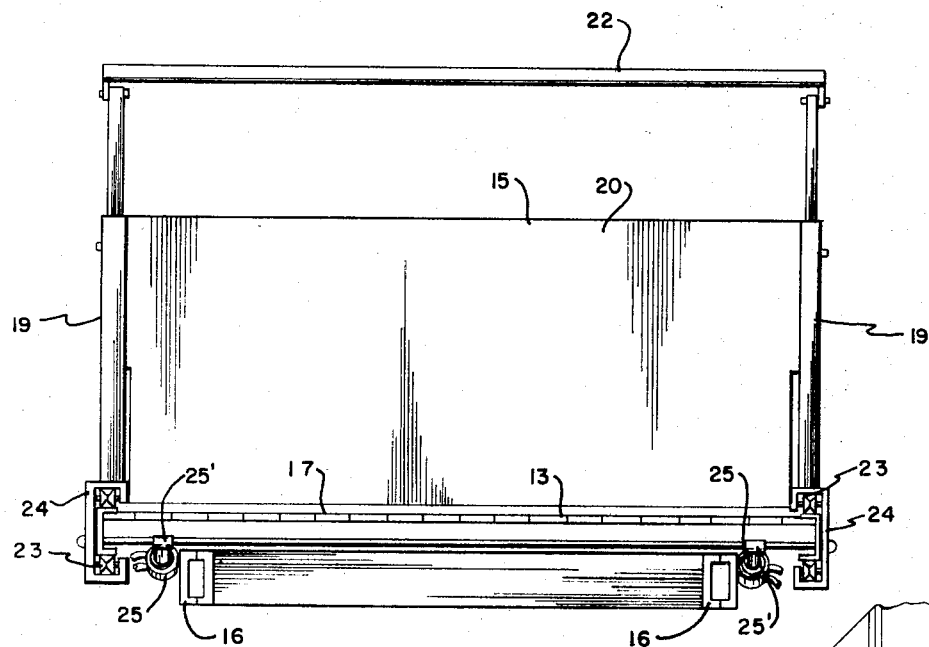
FIG. 3 is a front end elevational view of the headboard.
Figure 4:
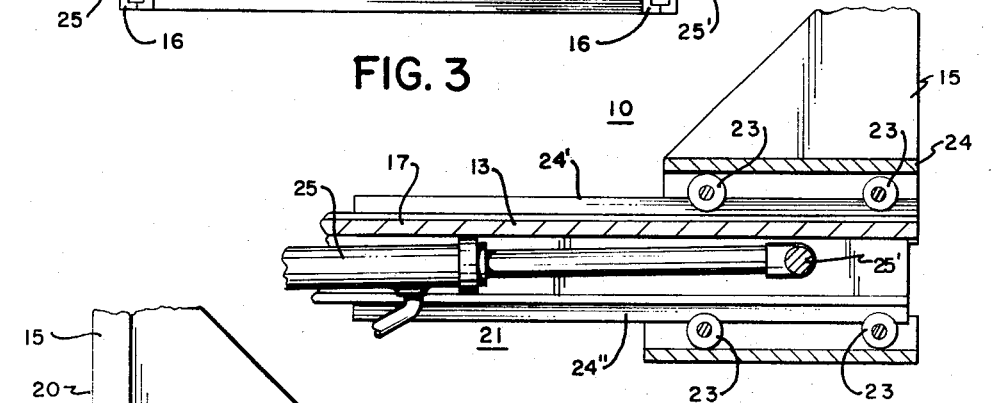
FIG. 4 is a fragmentary side elevational view of the headboard actuator including portions of the headboard frame broken away to show the interior configuration thereof.
Figure 5:
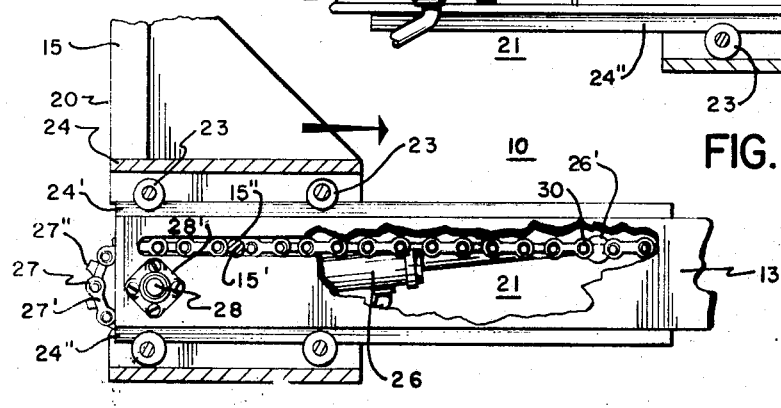
FIG. 5 is a side elevational view of a modified headboard actuator.

As partially shown in the FIGS. 3 and 4, the headboard 15 is actuated rectilinearly with respect to the platform 13 by the actuator sub-assembly 21 comprising a hydraulic ram 25 suitably mounted with its cylinder base (not shown) on a two-way main beam 16, with its piston head 25' directly mechanically connected to the lowermost terminal end of the headboard 15. Referring to the FIG. 5, the headboard 15 also may be actuated with respect to the platform 13 by an actuator sub-assembly 21 comprising a two-way hydraulic cylinder 26 fastened to one of the main beams 16, and by a pair of sprockets and chain 27. The sprockets and chain 27 comprise a pair of chains 27' each mounted distally interiorly adjacent the C-channels 24. A circuit is thus defined by the chains 27' each having their terminal ends at sprockets 27'' mounted on shafts 28 which are carried by journal bearings 28'. A piston head 26' provided on the cylinder 26 is fastened into a line 30 of the chains 27', of one of the circuit portions, here shown as the upper length of the circuit of the chains 27', while the headboard 15 is connected to the opposite portion, here shown as the lower circuit portion, by a rod 15' disposed through a slot 15'' in the terminal sides of the platform 13 and carried between the C-channels 24 by the chains 27' by their respective links 30. It may be seen that an hydraulic motor having a pinion may be substituted for the cylinder 26, and a rack cooperating with the pinion may be substituted for the sprocket and chain 27 as equivalent of the structure set out above. It is also to be understood that while two-way cylinders 26 are described, a pair of counter operated, complimentary one-way cylinders may also be used.

Referring to the FIG. 1, a container 12 may be lowered onto the platform 13 of the horizontal truck bed 10, or the loading forks 14 may be slid under a container 12 by backing the truck 11 toward the container 12. The container 12 may be secured onto the truck bed 10 by actuating the headboard 15 against the adjacent portion of the container 12. The ram 18 may then be actuated to raise or lower the platform 13 to load or unload the container 12.

It has been found to advantage to provide a container 22' retaining lip 22 comprising a pivotally mounted angle frame member 22' fastened between the cornerposts 14 and disposed with its interior vertex rearwardly over the expected uppermost forward terminal end of a container 12. In operation, the container retaining lip 22 engages the uppermost terminal end of the container 12 coextensively between the cornerposts 19. The corner-posts 19 may include a selectively locked, slidable rod portion 19' within a substantially tubular main portion 19'' which is fastened to the headboard 1. The slideable arm 19' permits carriage of containers having varying heights.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In a truck bed having a pallet which is supported by a pair of parallelly, rectilinearly disposed main beams, which is provided with means for pivotally mounting said pallet over the rearwardmost terminal end of a truck chassis, and which is provided with means for selectively raising and lowering said pallet into a substantially vertical position and a plurality of loading forks which are substantially perpendicularly mounted at the rearwardmost terminal end of said pallet, a movable headboard which is disposed transversely at the forward portion of said pallet, comprising:

a pair of upstanding cornerposts mounted on suitable rollers which ride along said rectilinear main beams and including a container containing lip comprising an inverted L-shaped member disposed with its inside vertex rearwardly with respect to said truck bed, said L-shaped member being pivotally mounted to the terminal ends of said cornerposts;

a head plate fastened between said cornerposts;

a headboard actuator sub-assembly including a pair of actuator means which are mounted along said main beams of said pallet for selectively moving said headboard with respect to said pallet.

* * * * *